(12) United States Patent
Abramov et al.

(10) Patent No.: US 9,399,593 B2
(45) Date of Patent: Jul. 26, 2016

(54) THERMAL BARRIERS TO GUIDE GLASS CUTTING AND PREVENT CRACKOUT

(71) Applicant: Corning Incorporated, Corning, NY (US)

(72) Inventors: Anatoli Anatolyevich Abramov, Painted Post, NY (US); Steven Roy Burdette, Big Flats, NY (US); Priyank Paras Jain, Corning, NY (US); Jingru Zhang, Columbia, MD (US); Rui Zhang, Elmira, NY (US)

(73) Assignee: CORNING INCORPORATED, Corning, NY (US)

( * ) Notice: Subject to any disclaimer, the term of this patent is extended or adjusted under 35 U.S.C. 154(b) by 124 days.

(21) Appl. No.: 14/511,633

(22) Filed: Oct. 10, 2014

(65) Prior Publication Data

US 2016/0102008 A1   Apr. 14, 2016

(51) Int. Cl.
 C03B 17/06   (2006.01)
 C03B 33/02   (2006.01)
 C03B 33/10   (2006.01)
 C03B 21/00   (2006.01)

(52) U.S. Cl.
 CPC ............. *C03B 17/064* (2013.01); *C03B 17/067* (2013.01); *C03B 21/00* (2013.01)

(58) Field of Classification Search
 None
 See application file for complete search history.

(56) References Cited

U.S. PATENT DOCUMENTS

| | | | |
|---|---|---|---|
| 7,895,861 B2 | 3/2011 | Chalk et al. ...................... 65/97 |
| 8,037,716 B2 | 10/2011 | Aniolek et al. .................. 65/95 |
| 8,141,388 B2 | 3/2012 | Burdette | |
| 8,245,539 B2 | 8/2012 | Lu et al. ............................ 65/97 |
| 2007/0151962 A1 | 7/2007 | Doll et al. | |
| 2008/0264994 A1* | 10/2008 | Herve ................. C03B 33/0215 225/2 |
| 2010/0102042 A1* | 4/2010 | Garner ................ C03B 33/0215 219/121.68 |
| 2012/0006058 A1 | 1/2012 | Dahroug et al. ............. 65/29.12 |
| 2013/0133367 A1* | 5/2013 | Abramov ............... C03B 17/06 65/53 |
| 2013/0134200 A1* | 5/2013 | Cavallaro, III ...... C03B 33/0215 225/2 |
| 2014/0137601 A1 | 5/2014 | Aburada et al. | |
| 2014/0182338 A1 | 7/2014 | Abramov et al. | |
| 2014/0284366 A1 | 9/2014 | Cho et al. | |

FOREIGN PATENT DOCUMENTS

WO    2014082000 A1    5/2014

OTHER PUBLICATIONS

Korean Intellectual Property Office; International Search Report for International Application No. PCT/US2015/054915; Mail Date: Jan. 7, 2016; pp. 1-11.

* cited by examiner

*Primary Examiner* — Jason L Lazorcik
(74) *Attorney, Agent, or Firm* — Kevin M. Able

(57) ABSTRACT

A method of forming a glass article includes drawing a glass ribbon from a draw housing in a downstream direction, heating portions of only a bead of the glass ribbon to form compressive stress regions in the bead, scoring the glass ribbon to form a score line on which the glass ribbon is broken. The bead is heated at a position upstream from the score line. An apparatus for manufacturing a glass article includes a draw housing for forming a glass ribbon having a bead, a heating apparatus with a heat source for forming compressive stress regions in portions of only the bead of the glass ribbon, and a scoring apparatus that forms a score line on which the glass ribbon is broken to form the glass article. The heat source moves downstream simultaneously with the glass ribbon.

12 Claims, 5 Drawing Sheets

THERMAL BARRIERS TO GUIDE GLASS CUTTING AND PREVENT CRACKOUT

BACKGROUND

1. Field

The present specification generally relates to methods and apparatuses for fabricating glass ribbons and, more particularly, to methods and apparatuses for guiding glass cutting and preventing crackout of the glass ribbon during cutting.

2. Technical Background

Glass ribbons may be formed by processes such as the fusion draw process, the slot draw process, or other similar downdraw processes. The fusion draw process yields glass ribbons which have surfaces with superior flatness and smoothness when compared to glass ribbons produced by other methods. Individual glass sheets sectioned from glass ribbons formed by the fusion draw process can be used in a variety of devices including flat panel displays, touch sensors, photovoltaic devices, and other electronic applications.

Glass ribbons formed by the fusion draw process have beads at the edges of the glass ribbon. The beads tend to be thicker than a center portion of the glass ribbon and, thus, cool more slowly and unevenly than other portions of the glass ribbon, which causes residual stresses to develop in the glass that can lead to cracking. Particularly, when horizontally separating glass sheets from the glass ribbon at the bottom of the draw, cracks may occur inside the bead regions and propagate vertically up the draw toward the fusion draw machine. This cracking can lead to breakage and crackout, which causes loss of process time and, possibly, product. Crackout is particularly prevalent in laminate fusion processes where double bead features and complex residual stresses can exacerbate the stresses that lead to cracking upon horizontal separation of a glass sheet from the ribbon.

Accordingly, alternative methods and apparatuses for preventing crackout during horizontal separation of a glass sheet from the ribbon are disclosed herein.

SUMMARY

In embodiments, a method of forming a glass article is disclosed. In the method, a glass ribbon is formed by drawing the glass ribbon from a draw housing in a downstream direction, the glass ribbon comprising a bead. One or more portions of only the bead of the glass ribbon is heated to form one or more compressive stress regions in the bead. Then, the glass ribbon is scored to form a score line on which the glass ribbon is broken to form a glass article. The bead is heated at a position upstream from the score line.

In another embodiment, an apparatus for manufacturing a glass article is disclosed. The apparatus includes a draw housing for forming a glass ribbon by drawing the glass ribbon in a downstream direction, the glass ribbon comprising a bead. The apparatus also includes a heating apparatus comprising a heat source for forming one or more compressive stress regions in one or more portions of only the bead of the glass ribbon, and a scoring apparatus that forms a score line on which the glass ribbon is broken to form the glass article. In embodiments, the heat source moves downstream simultaneously with the glass ribbon.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 2:
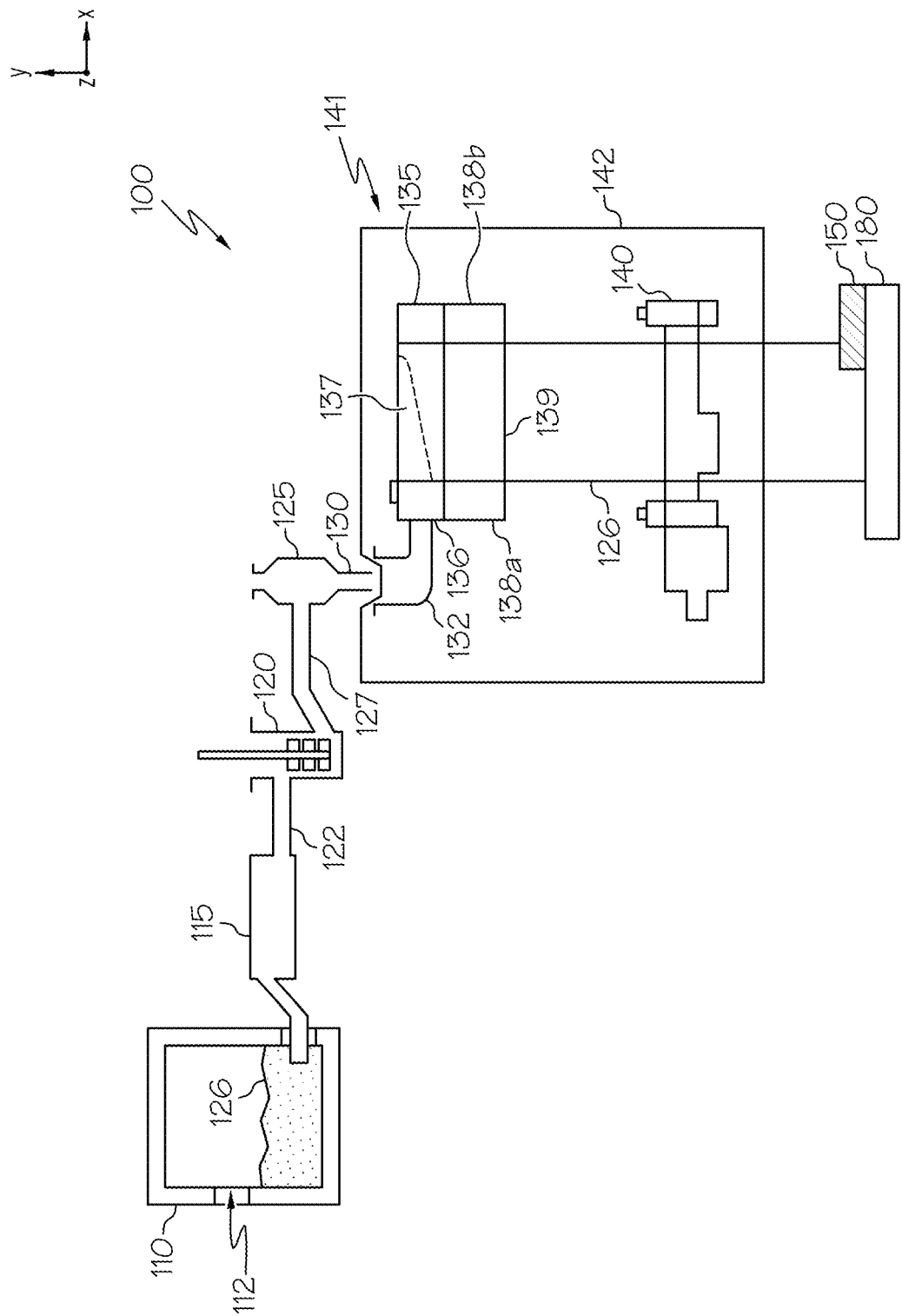
FIG. 2 schematically depicts a down draw glass forming apparatus according to embodiments provided herein.

Reference will now be made in detail to various embodiments of methods and apparatuses for fabricating glass articles, examples of which are illustrated in the accompanying figures. Whenever possible, the same reference numerals will be used throughout the drawings to refer to the same or like parts. FIG. 2 schematically depicts one embodiment of an apparatus for fabricating glass ribbons by drawing the glass ribbons in a drawing direction. The apparatus generally comprises a draw housing, a scoring apparatus, and a heating apparatus. The draw housing comprises a bottom opening through which the glass ribbon is drawn. The heating apparatus can be positioned downstream of the bottom opening of the draw housing. In embodiments, the heating apparatus may be mounted on the scoring apparatus. The heating apparatus heats a portion of only the bead of the glass ribbon, thereby forming a compressive stress region in the bead of the glass ribbon. The compressive stress region has compressive stress sufficient to prevent crack propagation up the draw and back into the FDM. In embodiments, the compressive stress region may be positioned substantially parallel to a score line, and in other embodiments, the compressive stress region may be positioned diagonally to the score line. Various embodiments of methods and apparatuses for fabricating glass articles will be described in further detail herein with specific reference to the appended drawings.

Coordinate axes are included in the drawings to provide a frame of reference for various components of the glass ribbon fabrication apparatuses and methods described herein. As used herein, a "lateral" or "across-the-draw" direction is defined as the positive x or negative x direction of the coordinate axes shown in the drawings. A "downstream" or "drawing" direction is defined as the negative y direction of the coordinate axes shown in the drawings. An "upstream" direction is defined as the positive y direction of the coordinate axes shown in the drawings.

Figure 1:
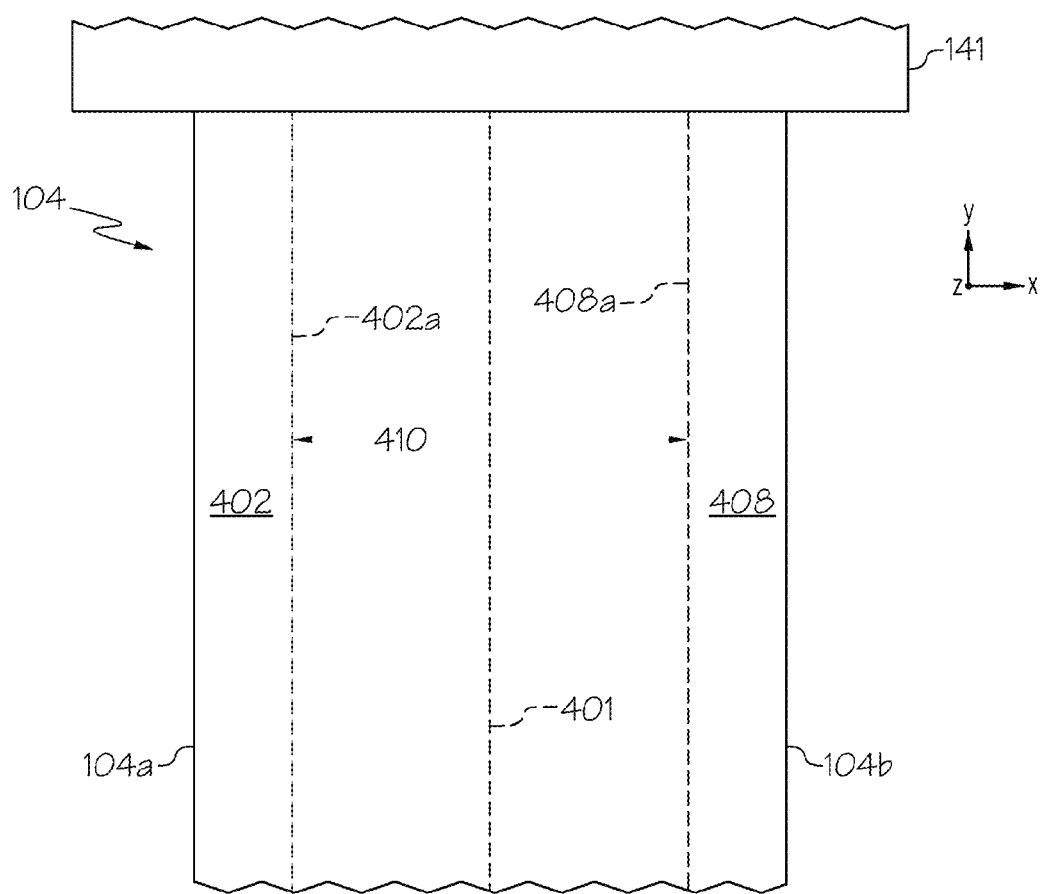
FIG. 1 schematically depicts a glass ribbon according to embodiments provided herein.

FIG. 1 illustrates a portion of an exemplary glass ribbon 104. The glass ribbon 104 is defined in a lateral direction by a first edge 104a extending in the drawing direction and a second edge 104b extending in the drawing direction. The glass ribbon 104 also includes a centerline 401 extending in the drawing direction. The glass ribbon 104 further includes a first bead portion 402, a central region 410 (also referred to as the "quality region"), and a second bead portion 408. The beads 408, 402 are formed as the glass ribbon 104 descends from the forming body and the edge portions of the ribbon 104 thicken. Separating the glass ribbon 104 across the beads 408, 402 has proven difficult, and may result in a large release of energy that can form cracks that propagate in the ribbon 104 in an upstream and/or downstream direction, potentially damaging the glass ribbon and/or the glass sheet separated from the glass ribbon. In extreme cases, cracks propagating from the glass ribbon may cause an undesired separation of the glass ribbon above the intended line of separation which may interrupt the glass ribbon manufacturing process.

Still referring to FIG. 1, the first bead portion 402 extends in the drawing direction and is laterally defined by the first edge 104a of the glass ribbon 104 and a first bead edge 402a laterally positioned between the first edge 104a and the centerline 401. The second bead portion 408 extends in the drawing direction and is laterally defined by the second edge 104b of the glass ribbon 104 and a second bead edge 408a laterally positioned between the second edge 104b and the centerline 401. While the first bead portion 402, the first bead edge 402a, the second bead portion 408, and the second bead edge 408a are depicted at specific lateral locations in FIG. 1, it should be understood that in other embodiments, the first bead portion 402, the first bead edge 402a, the second bead portion 408, and the second bead edge 408a may differ from what is depicted in FIG. 1.

Referring now to FIG. 2, an embodiment of an exemplary glass manufacturing apparatus 100 for manufacturing the glass ribbon of FIG. 1 is schematically depicted. As an initial matter, while the exemplary glass manufacturing apparatus 100 described below forms glass ribbons by a fusion draw process, it should be understood that the methods and apparatuses described herein may be used in conjunction with other down draw processes, including, without limitation, slot draw processes, and the like.

The glass manufacturing apparatus 100 depicted in FIG. 2 includes a melting vessel 110, a fining vessel 115, a mixing vessel 120, a delivery vessel 125, a fusion draw machine ("FDM") 141, a traveling anvil machine ("TAM") 180, and at least one heating apparatus 150. The melting vessel 110 is fluidly coupled to the fining vessel 115. The fining vessel 115 is fluidly coupled to the mixing vessel 120 by a connecting tube 122. The mixing vessel 120 is, in turn, fluidly coupled to the delivery vessel 125 by a connecting tube 127. The delivery vessel 125 is fluidly coupled to the FDM 141 through a downcomer 130. The FDM 141 comprises a draw housing 142, an inlet 132, a forming vessel 135 fluidly coupled to the inlet 132, and a pull roll assembly 140. The forming vessel 135 includes an opening 136 that is fluidly coupled to the inlet 132 and a trough 137 fluidly coupled to the opening 136. The trough 137 comprises two sides 138a and 138b. The pull roll assembly 140 is positioned near the bottom of the draw housing 142 of the FDM 141.

The TAM 180 is positioned downstream of the bottom opening of the draw and separates sheets of glass from the glass ribbon 104 by scoring the glass ribbon 104 laterally, or across the draw. The mechanism used to score the glass ribbon 104 is not limited and, in embodiments, may include lasers or a scoring wheel. Regardless of the mechanism used to cut a glass sheet from the glass ribbon 104, a score line is formed in the glass ribbon 104, which facilitates separation of a glass sheet from the glass ribbon 104. To make an accurate and straight score line, the TAM 180 is moveable downstream simultaneously with the glass ribbon 104 while it is scoring the glass ribbon 104 laterally. A conventional robotic apparatus below the TAM (not shown) holds the sheet with suction cups, bends the sheet and breaks it along the score line. The TAM 180 operates in cycles, the cycle beginning at a first position that is upstream from the location where the glass will be bent and separated. The scoring mechanism moves laterally along the score line from a first edge 104a toward a second edge 104b of the glass ribbon 104, while the glass ribbon 104 and the TAM 108 continue to travel downstream at the same rate. The TAM 180 then reaches the end of its stroke at a second position once the scoring process is completed. The glass bending is carried out along the score line and the robotic equipment located near but downstream from the score line, separates an individual glass sheet from the glass ribbon 104. The TAM 180 moves upstream, returning to the beginning of the stroke at the first position. In embodiments, the duration of the scoring and, thus, the duration of the TAM's 180 downstream movement may be less than or equal to about 7 seconds, such as less than or equal to about 6 seconds, or even less than or equal to about 5 seconds.

Scoring the glass ribbon 104 results in a large release of energy that can form cracks in the beads 408, 402 that may propagate upstream toward the FDM 141 and cause a complete unintended separation of the glass ribbon, referred to as a crackout. However, forming compressive stress regions in the beads 408, 402 can impede the cracking and/or can be used to direct the cracking in a direction that will not impact the quality region 410 of the glass ribbon 104, such as by directing the cracking toward an edge 104a, 104b of the glass ribbon 104 rather than in an upstream direction or laterally, towards the quality area of the glass ribbon 104. In the embodiments described herein, compressive stress regions may be formed by creating temperature differentials between a portion of the bead 408, 402 where a compressive stress region is to be formed, and surrounding portions of the bead. This temperature differential causes the glass within the compressive stress region to expand while the glass in portions of the bead 408, 402 surrounding the compressive stress region are cooling and contracting. The differences in expansion and contraction of these portions of the glass will cause compressive stress regions to form. Thus, in embodiments, compressive stress regions may be formed in the beads 408, 402 by exposing portions of the beads 408, 402 to a heat source, which may be generated by a heating apparatus 150.

The heating apparatus 150 is positioned downstream of the bottom opening of the draw housing 142. In embodiments, the heating apparatus comprises a heat source that irradiates at least one portion of one or more beads 408, 402 of the glass ribbon 104. To provide the heating necessary to create compressive stresses in the beads 408, 402 that will prevent cracking from progressing into the FDM 141, the portion(s) of the one or more beads 408, 402 is exposed to the heat source for a certain period of time. Thus, in embodiments, the heat source travels downstream with the glass ribbon 104 in order to provide sufficient heating to create the compressive stress regions. In embodiments, the heating apparatus 150 comprises a stationary heat source and the heating apparatus 150 moves downstream simultaneously with the glass ribbon 104. In other embodiments, the heating apparatus 150 is stationary and the heat source is moveable, such as by providing a moveable laser or infrared heat source mounted in the stationary heating apparatus 150.

In embodiments, the heating apparatus 150 may be attached to the TAM 180. In such embodiments, the heat source may be stationary and the entire heating apparatus 150 moves downstream with the glass ribbon 104 on the TAM 180. In other embodiments, the heating apparatus 150, which comprises a stationary heating source, may be separate from the TAM 180 and mounted on a moveable platform that, like the TAM 180, moves simultaneously downstream with the glass ribbon 104. In yet other embodiments, the heating apparatus 150 may be stationary and includes a moveable heat source, such as a laser or infrared lamp, that is programmed to move at a speed such that the heat applied to the glass ribbon from the heat source moves downstream simultaneously with the glass ribbon 104.

Figure 3B:
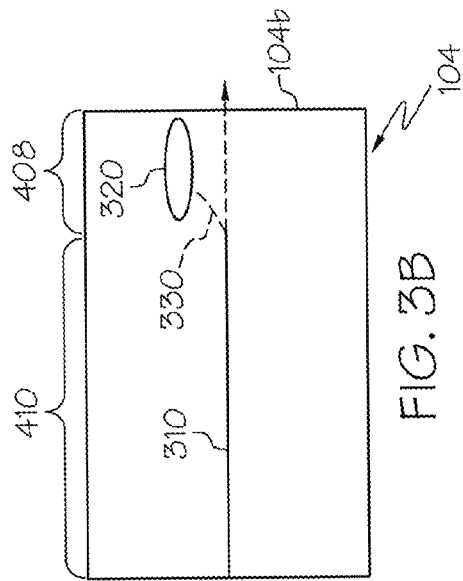
FIGS. 3A-3D schematically depict glass ribbons with compressive stress regions according to embodiments provided herein.
Figure 3D:
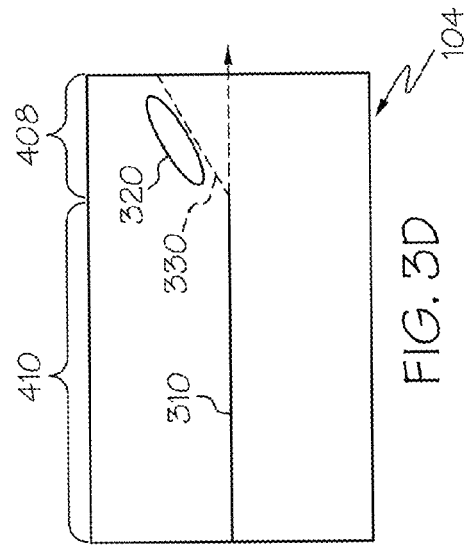

Referring to FIGS. 1 and 2, in embodiments, the heating apparatus 150 may comprise a first heat source positioned to apply heat to a bead 408, 402 on an upstream side of a score line and a second heat source positioned to apply heat to a bead 408, 402 on a downstream side of the score line. In other embodiments the heating apparatus 150 may comprise one heat source that is positioned to apply heat to a bead 408, 402 at an upstream side of the score line. In some embodiments the heat source may be positioned substantially parallel to the score line, or the heat source may be positioned diagonally to the score line. In embodiments, the heat source is configured so that heat is not applied past an edge 408a, 402a of the bead 408, 402 and into the center portion 410 of the glass ribbon 104. It should be understood that other configurations of the heat source are contemplated and possible. Exemplary compressive stress regions formed in the bead 408 using the above-described heat sources are shown in FIGS. 3B-3D.

In embodiments, the heating apparatus 150 can include an infrared heat source. However, it should be understood that, in other embodiments, the heating apparatus 150 can include a heat source other than an infrared heat source. In embodiments in which the heating apparatus 150 includes an infrared heat source, the infrared heat source can be configured to emit radiation in a wavelength range of greater than or equal to about 2.5 microns to less than or equal to about 6.5 microns. In other embodiments, the infrared heat source can be configured to emit radiation in a wavelength range of greater than or equal to about 2.5 microns to less than or equal to about 4.0 microns, or in a wavelength range of greater than or equal to about 2.5 microns to less than or equal to about 3.0 microns. In embodiments using an infrared heat source, the heat may be concentrated to a specific portion of the bead 408, 402 and moved downstream simultaneously with the glass ribbon 104 using one or more concave mirrors, which may be stationary or moveable, to reflect and direct the infrared radiation onto the glass ribbon 104 in the desired location.

In alternative embodiments, the heating apparatus 150 can include a laser as a heat source. In embodiments, in which the heating apparatus 150 includes a laser heat source, the laser heat source may be a $CO_2$ laser, a CO laser, or a UV laser. In embodiments where a $CO_2$ laser is used, the $CO_2$ laser may be configured to emit radiation in a wavelength range of greater than or equal to about 9.0 microns to less than or equal to about 11.0 microns, such as a wavelength range of greater than or equal to about 9.4 microns to less than or equal to about 10.6 microns. In embodiments where a CO laser is used, the CO laser may be configured to emit radiation in a wavelength range of greater than or equal to about 2.0 microns to less than or equal to about 8.5 microns, such as a wavelength range of greater than or equal to about 2.6 microns to less than or equal to about 8.3 microns. In embodiments where a UV laser is used, the UV laser may be configured to emit radiation in a wavelength range of greater than or equal to about 260 nanometers to less than or equal to about 380 nanometers, such as a wavelength range of greater than or equal to about 262 nanometers to less than or equal to about 375 nanometers. In embodiments, the laser may be configured to emit radiation in a power range of greater than or equal to about 20 W to less than or equal to about 100 W, such as from greater than or equal to about 30 W to less than or equal to about 90 W. In some embodiments, the laser may be configured to emit radiation of about 50 W. In embodiments using lasers, the laser may be a scanning laser that is programmed to move downstream at the same speed as the glass ribbon 104.

Referring to FIG. 2, during operation of the glass manufacturing apparatus 100, glass batch materials are introduced into the melting vessel 110 as indicated by arrow 112. The batch materials are melted in the melting vessel 110 to form molten glass 126. The molten glass 126 flows from the melting vessel 110 to the fining vessel 115. The fining vessel 115 receives the molten glass 126 in a high temperature processing area in which bubbles are removed from the molten glass 126. After being processed in the fining vessel 115, the molten glass 126 flows to the mixing vessel 120 via connecting tube 122 in which the molten glass 126 is mixed. After being mixed in the mixing vessel 120, the molten glass 126 flows into the delivery vessel 125 via connecting tube 127.

The delivery vessel 125 supplies the molten glass 126 through a downcomer 130 into the inlet 132 of the FDM 141, through which the molten glass 126 is supplied to the forming vessel 135. The molten glass 126 is received through the opening 136 of the forming vessel 135 and flows into the trough 137. After entering the trough 137, the molten glass 126 overflows and runs down two sides 138a and 138b of the trough 137 before fusing together at a root 139. The root 139 is where the two sides 138a and 138b come together and where the two overflow walls of molten glass 126 rejoin (e.g., refuse) before being drawn downstream by the pull roll assembly 140 to form the glass ribbon 104.

After being formed and drawn downstream by the pull roll assembly 140, the glass ribbon 104 exits the bottom opening of the draw housing 142. After exiting the draw housing 142, the glass ribbon 104 begins to cool, as described above, and complex residual stresses associated with cooling in the thicker bead regions 408, 402 of the glass ribbon 104 may lead to cracking of the glass ribbon 104 along the beads 408, 402. The glass ribbon 104 may be particularly prone to crack propagation when the glass ribbon 104 is scored by the TAM 180. The cracking may propagate upstream and into the FDM 141 causing crackout. Alternatively or additionally, the cracking may propagate downstream away from the FDM 141. In either situation, the resultant cracking may lead to lost process time and, possibly, lost product. Without being bound by any particular theory, it is believed that introducing localized compressive stresses at the bead 408, 402, such as by localized heating as described above, on at least an upstream side of the score line prevents propagation of formed cracks in an upstream direction, and may be used to direct the propagation of the cracks away from the center 410 of the glass ribbon 104.

Figure 3A:
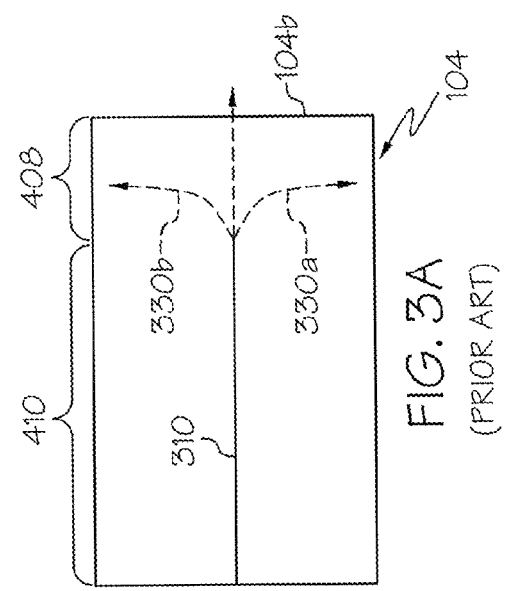
Figure 3C:
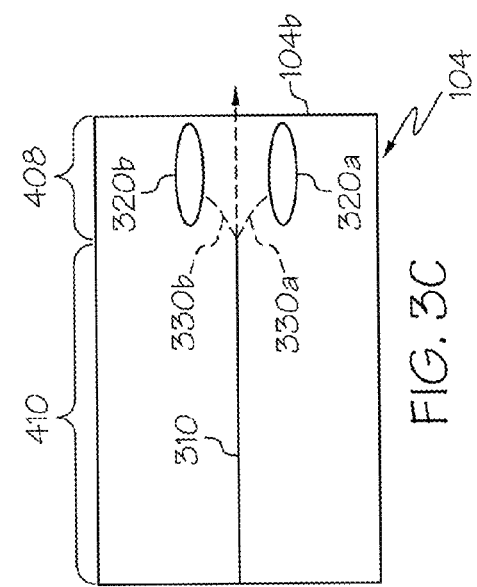

Referring to FIG. 3A, a glass ribbon 104 scored by the TAM 180 to create score line 310 according to conventional methods is schematically depicted. Cracks 330a, 330b may be formed in the bead 408 of the glass ribbon 104 from the score line 310 and propagate upstream (as shown by crack 330b) toward the FDM 141 or downstream (as shown by crack 330a) away from the FDM 141. The cracking is not easily controllable and crack propagation may eventually migrate toward the center 410 of the glass ribbon 104, which could damage the glass ribbon or a glass sheet separated therefrom.

Referring now to FIG. 3B, to address the cracking, a heating apparatus (not shown) irradiates a surface of the bead 408 of the glass ribbon 104 with a heat source at a position upstream from the score line 310. The heat source moves downstream simultaneously with the glass ribbon thereby irradiating the same portion of the bead 408 of the glass ribbon 104 for a time duration sufficient to form a region of compressive stress 320. Thereafter, a crack 330 may be formed that propagates upstream from the score line 310 but is prevented from propagating into the FDM 141 by compressive stress region 320.

Referring to FIG. 3C, in another embodiment, a heating apparatus (not shown) comprises a first heat source positioned so that it irradiates a portion of the bead 408 upstream from the score line 310. The heating apparatus further comprises a second heat source that is positioned so that it irradiates a portion of the bead 408 downstream from the score line 310. The first and second heat source move downstream simultaneously with the glass ribbon 104, thereby irradiating the same portions of the bead 408 of the glass ribbon 104 for a time duration sufficient to form compressive stress regions 320a, 320b in the bead 408. The first heat source is used to form compressive stress region 320b that is positioned upstream from the score line 310. A first crack 330b may be formed that propagates upstream from the score line 310, but is prevented from propagating upstream into the FDM 141 by compressive stress region 320b. The second heat source is used to form compressive stress region 320a that is positioned downstream from the score line 310. A second crack 330a may be formed that propagates downstream from the score line 310, but is halted from proceeding too far downstream by compressive stress region 320a.

Referring to FIG. 3D, in another embodiment, a heating apparatus (not shown) comprises a heat source positioned to irradiate a portion of the bead 408 diagonal to the score line 310. The heat source moves downstream simultaneously with the glass ribbon, thereby irradiating the same portion of the bead 408 for a time duration sufficient to form compressive stress region 320 that is diagonal to the score line 310. The diagonal compressive stress region 320 slants away from the center of the ribbon such that a portion of the compressive stress region 320 closest to the center of the ribbon is also closest to the score line 310 and a portion of the compressive stress region closest to the edge 104b of the glass ribbon is furthest from the score line 310. A crack 330 may be formed that propagates upstream from the score line 310, but the crack 330 is impeded or redirected by the slanting nature of the diagonal compressive stress region 320 toward an edge 104b of the glass ribbon 104, thereby preventing the crack 330 from propagating upstream and into the FDM 141.

In embodiments, the compressive stress region is formed only in a portion of the bead 408, 402 of the glass ribbon and is not formed in the center 410 of the glass ribbon or the entirety of the bead 408, 402. Forming a compressive stress region as disclosed above in the center (or quality region) 410 of the glass ribbon introduces unwanted inconsistencies in the quality region 410 of the glass sheet that may hinder performance of the glass article that is to be formed from the glass ribbon. In contrast, forming compressive stress regions as discussed above in the bead 408, 402 will not negatively impact the performance of the glass article to be formed from the glass ribbon 104 because the beads 408, 402 are not generally included in the usable portion of a glass article. In addition, forming a compressive stress region in the entirety of the bead is not necessary to prevent crack propagation. Thus, in embodiments, compressive stress regions 320 are formed only in portions of the beads 408, 402 of the glass ribbon.

The compressive stress formed in the compressive stress regions 320 by the heat source is sufficient to impede or redirect crack propagation. In embodiments, the compressive stress in the compressive stress region 320 is greater than or equal to about 8 MPa, such as greater than or equal to about 10 MPa. In embodiments, the compressive stress in the compressive stress region 320 is less than or equal to about 20 MPa, such as less than or equal to about 16 MPa. If the amount of compressive stress introduced by the heat source is below 8 MPa, the compressive stress region 320 may not be sufficient to prevent the crack 330 from propagating up the draw and into the FDM. However, if the compressive stress introduced by the heat source is above 20 MPa, the compressive stress region may disturb further processing of the glass ribbon, which can lead to lost production time.

Figure 4:
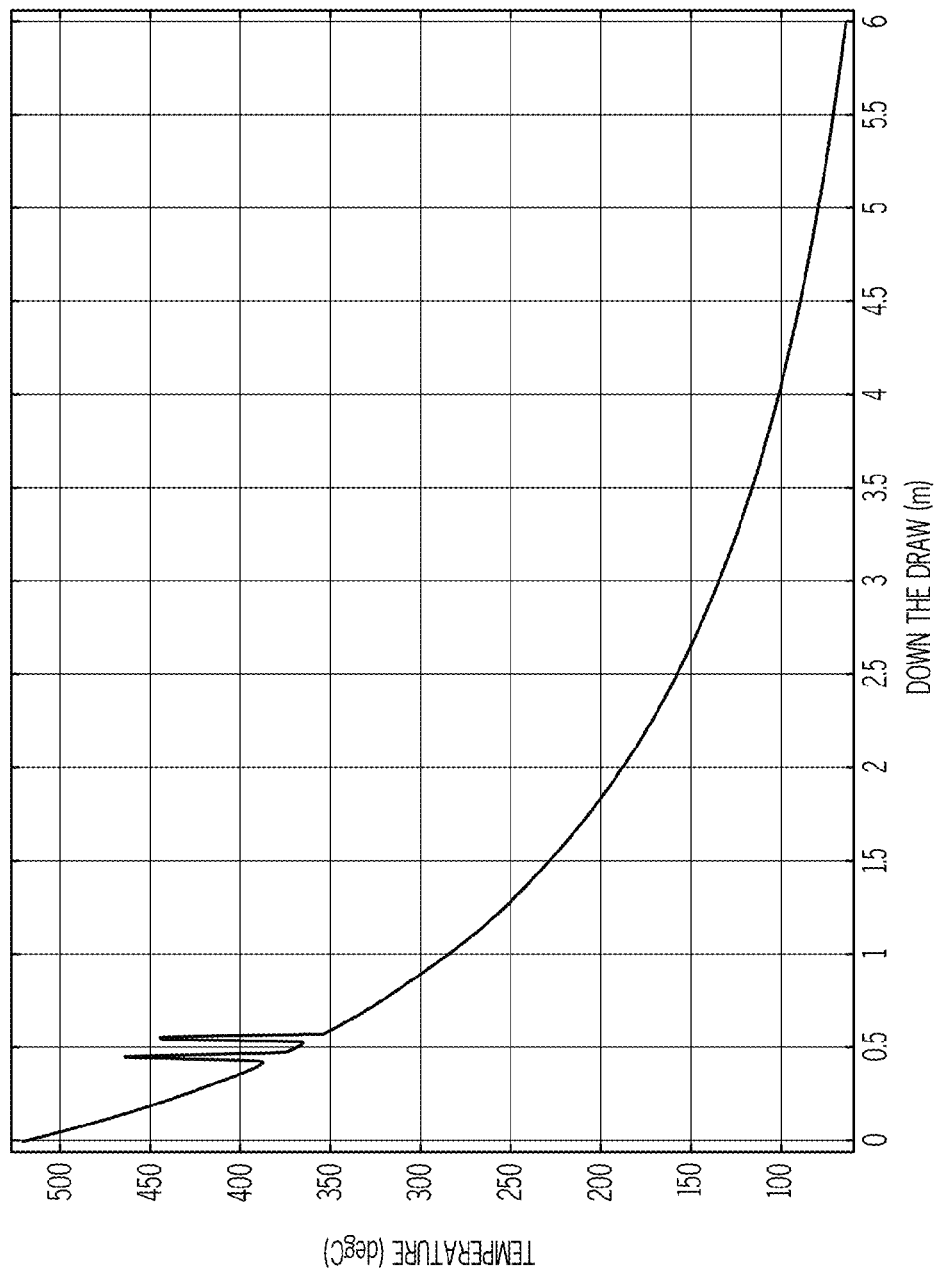
FIG. 4 graphically depicts a cooling profile of a glass ribbon according to embodiments provided herein.

As noted above, the compressive stress region(s) 320 are formed by applying a heat source, such as infrared radiation or a laser beam, to the surface of the glass ribbon 104. The heat source creates a temperature differential between a compressive stress region of the bead and the surrounding portions of the bead. This temperature differential causes the glass in the compressive stress region of the bead to expand while the surrounding portions of the bead are cooling and contracting. The differing forces caused by this expansion and contraction form the compressive stress regions in the bead of the glass ribbon. Accordingly, in embodiments, the temperature differential between the compressive stress regions of the bead, while they are being heated by the heat source, and the surrounding portions of the bead is from greater than or equal to about 50° C. to less than or equal to about 200° C., such as from greater than or equal to about 75° C. to less than or equal to about 175° C. In other embodiments, the temperature differential between the compressive stress regions of the bead, while they are being heated by the heat source, and the surrounding portions of the bead is from greater than or equal to about 100° C. to less than or equal to about 150° C., such as from greater than or equal to about 110° C. to less than or equal to about 125° C. FIG. 4 graphically shows the temperature profile of a glass ribbon according to an embodiment. The x-axis of the graph represents distance down the draw in meters, and the y-axis represents temperature in degrees Celsius. The embodiment shown in FIG. 4 provides two heat sources at locations between 0.5 m and 1.0 m down the draw. In the embodiment shown in FIG. 4, the glass ribbon cools exponentially as it moves down the draw, except for the regions where the heat sources are provided. The heat sources shown in FIG. 4 provide a temperature between the compressive stress regions of the bead, while they are being heated by the heat source, and the surrounding portions of the bead differential of about 100° C. In the embodiment depicted in FIG. 4, the glass ribbon is heated with a single mode $CO_2$ laser having a power of about 50 W.

The temperature differential between the compressive stress regions of the bead, as they are being heated by the heat source, and the surrounding portions of the bead are inversely related to the coefficient of thermal expansion (CTE) of the glass composition that is being drawn. For instance, the higher the CTE of the glass composition, the lower the temperature differential that will be needed to achieve the desired compressive stress. Accordingly, in embodiments, the required temperature differential between compressive stress regions of the bead and the surrounding portions of the bead may be calculated using the following equation, where $\Delta T$ is the temperature differential, $\alpha$ is CTE, E is the elastic modulus, and $\sigma$ is the desired level of compressive stress to stop crack propagation or change crack propagation direction.

In embodiments, the temperature of the glass article is less than the strain point of the glass composition (i.e., the temperature where the viscosity of the glass is $10^{14.5}$ poise).

Therefore, when calculating the temperature differential necessary to achieve the desired compressive stress in the compressive stress region, the temperature of the glass ribbon coming out of the draw must be considered so that the compressive stress region is not heated above the strain point of the glass composition.

To produce the desired temperature differential in a reasonable amount of time, the heat source will need to have a sufficient heat flux. The longer the duration that the bead is able to be exposed to the heat source, the lower the heat flux of the heat source needs to be. The heat flux required to produce a compressive stress region will vary according to the glass composition that is being heated. In embodiments, the peak heat flux applied to a surface of the glass ribbon is from greater than or equal to about 10 kw/m² to less than or equal to about 30 kw/m², such as from greater than or equal to about 12.5 kw/m² to less than or equal to about 25 kw/m². If the heat flux is below 10 kw/m², it will be difficult to form a compressive stress region in the glass in the amount of time provided by the process before crack propagation, such as the amount of time it takes the TAM to score the glass ribbon. If the heat flux is greater than about 30 kw/m², the heat source may melt the glass, which will not only fail to produce the desired compressive stress region, but may also impede processing of the glass ribbon. Therefore, in embodiments, the heat flux is controlled to provide heating that creates a compressive stress region without melting the glass.

Heat flux can be calculated by the following equation, where ρ is the density, h is the thickness, Cp is specific heat, t is the residence time/duration that heat source is on glass surface, ΔT is the desired temperature difference.

$$^H \rho h C_p \Delta T$$

Figure 5:
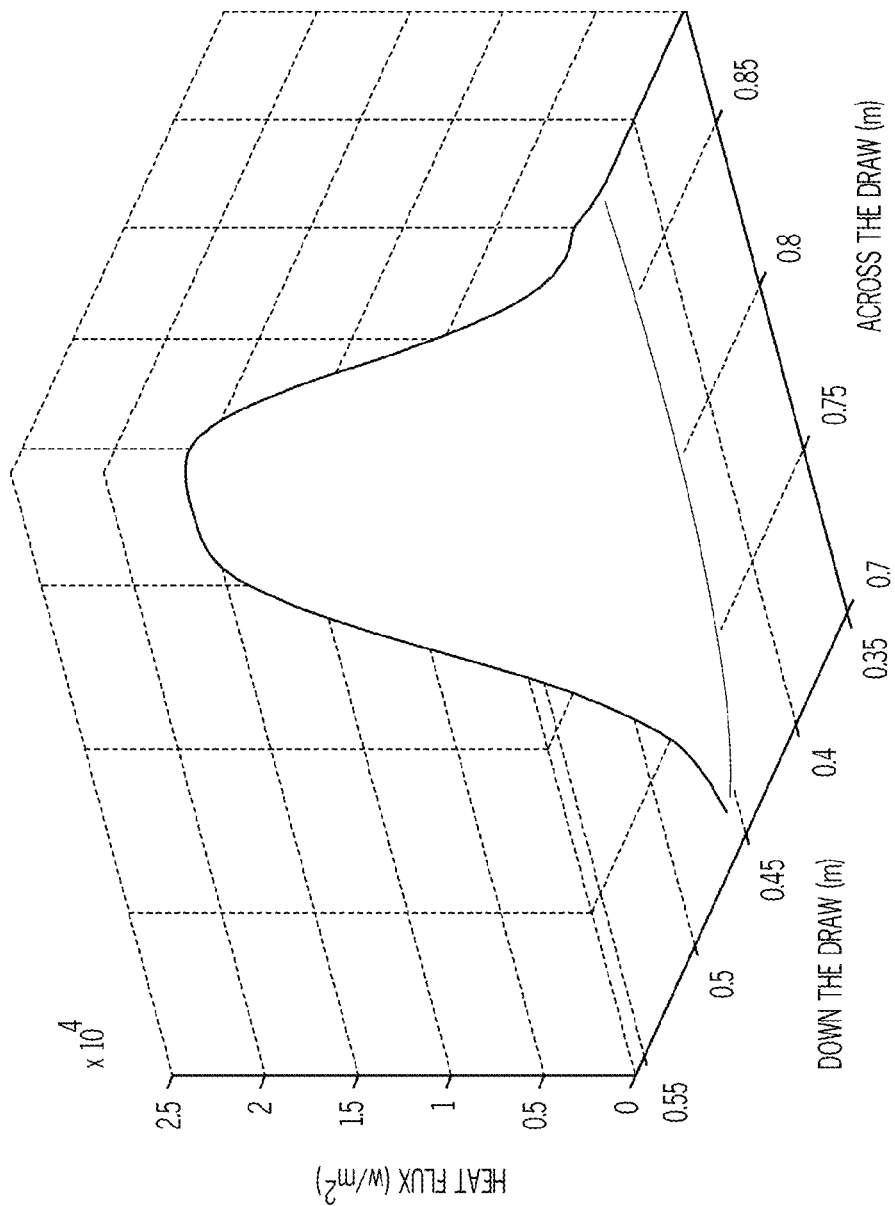
FIG. 5 graphically depicts heat flux profile according to embodiments provided herein.

FIG. 5 graphically shows the heat flux used to form a compressive stress region according to an embodiment. In FIG. 5, the x-axis represents distance across the draw in meters, the y-axis represents flux in w/m², and the z-axis represents distance down the draw in meters. As shown in FIG. 5, the heat flux used to produce a compressive stress region in this embodiment has a maximum of about 25 kw/m², and is focused on a very precise portion of the bead.

The time duration of the exposure to the heat source depends on the process limitations, such as the time duration of the scoring process. As noted above, a specific time duration is not required, and the heat flux may be modified based upon the time duration that the bead is exposed to the heat source. In embodiments, the time duration that the bead is exposed to the heat source may be less than or equal to about 10 seconds, such as less than or equal to about 9 seconds. In other embodiments, the time duration that the bead is exposed to the heat source may be less than or equal to about 8 seconds, such as less than or equal to about 7 seconds. In embodiments, the time duration that the bead is exposed to the heat source may be greater than or equal to about 3 seconds, such as greater than or equal to about 4 seconds. In other embodiments, the time duration that the bead is exposed to the heat source may be greater than or equal to about 5 seconds, such as greater than or equal to about 6 seconds.

The dimensions of the compressive stress region(s) 320 in the bead 408, 402 are not particularly limited, and will vary depending on the type of heat source that is used and the dimensions of the bead 408, 402 on the glass ribbon 104. In embodiments, the compressive stress region is wide enough across the draw that it stretches at least as long as the bead of the glass ribbon. For example, and with reference to bead 408, if the bead 408 of the glass ribbon extends 300 mm across the draw from the closest edge 104b of the glass ribbon 104, the compressive stress region 320 may also extend 300 mm across the draw from the closest edge 104b of the glass ribbon 104. In embodiments, the compressive stress region extends less than or equal to about 300 mm across the draw from the closest edge of the glass ribbon, such as less than or equal to about 250 mm across the draw from the closest edge of the glass ribbon. In other embodiments, the compressive stress region extends less than or equal to about 200 mm across the draw from the closest edge of the glass ribbon, such as less than or equal to about 150 mm across the draw from the closest edge of the glass ribbon. The height of the compressive stress region down the draw is proportional to the dimensions of the heat source being used. For example, and as shown in FIG. 5, the height of the compressive stress region may be as thin as the dimensions of a laser that is used to form the compressive stress region. In embodiments, the height of the compressive stress region is less than about 50 mm, such as less than about 25 mm. In embodiments, the depth of a stress region may be from greater than or equal to about 1.0 inch to less than or equal to about 2.0 inches, such as about 1.5 inches.

In embodiments, and as shown in FIGS. 3B-3D, a compressive stress region 320 may be formed upstream and, optionally, downstream from the score line 310. If the compressive stress region 320 is formed too close to the score line, the compressive stress region may impact scoring of the glass ribbon. However, if the compressive stress regions are formed too far from the score line, they will not adequately prevent crack propagation. Therefore, in embodiments, the compressive stress region(s) are formed at a position greater than about 25 mm upstream or downstream from the score line, such as at a position greater than about 50 mm upstream or downstream from the score line. In embodiments, the compressive stress region(s) are formed at a position less than about 75 mm upstream or downstream from the score line, such as at a position less than about 60 mm upstream or downstream from the score line.

It should be understood that although compressive stress regions are disclosed as being thermally introduced into the beads of the glass ribbons above, the compressive stress regions may be formed by any process that creates precision compressive stress regions in a glass article.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

In a first aspect, A method of forming a glass article, comprises: forming a glass ribbon by drawing the glass ribbon from a draw housing in a downstream direction, the glass ribbon comprising a bead; heating one or more portions of only the bead of the glass ribbon to form one or more compressive stress regions in the bead; and scoring the glass ribbon to form a score line on which the glass ribbon is broken to form the glass article, wherein the bead is heated at a position upstream from the score line.

A second aspect comprises the method of the first aspect, wherein the heating comprises heating the glass ribbon substantially parallel to the score line.

A third aspect comprises the method of the first aspect, wherein the heating comprises heating the glass ribbon diagonally to the score line.

A fourth aspect comprises the method of the first aspect, further comprising heating a portion of the bead at a position downstream from the score line.

A fifth aspect comprises the method of the fourth aspect, wherein the portion of the bead heated at a position downstream from the score line is heated substantially parallel to the score line.

A sixth aspect comprises the method of the first aspect, wherein a width of the one or more compressive stress regions extends less than about 300 mm across the draw from a closest edge of the glass ribbon.

A seventh aspect comprises the method of the first aspect, wherein a height of the one or more compressive stress regions extends less than or equal to about 50 mm upstream.

An eighth aspect comprises the method of the first aspect, wherein the bead is heated at a position that is greater than or equal to about 50 mm upstream from the score line.

A ninth aspect comprises the method of the first aspect, wherein the heating comprises heating the one or more portions of the bead to have a temperature differential from greater than or equal to about 50° C. to less than or equal to about 200° C. between the one or more compressive stress regions and surrounding portions of the bead.

A tenth aspect comprises the method of the first aspect, wherein the heating comprises exposing one or more portions of only the bead to a heat source having a peak heat flux of less than or equal to about 25 kw/m².

An eleventh aspect comprises the method of the first aspect, wherein the heating comprises heating the one or more portions of the bead to a temperature that is less than a strain point of the glass composition forming the glass ribbon.

A twelfth aspect comprises the method of the first aspect, wherein the compressive stress region has a compressive stress of greater than or equal to about 16 MPa.

In a thirteenth aspect, an apparatus for manufacturing a glass article comprises: a draw housing for forming a glass ribbon by drawing the glass ribbon in a downstream direction, the glass ribbon comprising a bead; a heating apparatus comprising a heat source for forming one or more compressive stress regions in one or more portions of only the bead of the glass ribbon; and a scoring apparatus that forms a score line on which the glass ribbon is broken to form the glass article, wherein the heat source moves downstream simultaneously with the glass ribbon.

A fourteenth aspect comprises the apparatus of the thirteenth aspect, wherein the heat source is stationary and the heating apparatus moves downstream simultaneously with the glass ribbon.

A fifteenth aspect comprises the apparatus of the fourteenth aspect, wherein the scoring apparatus is a traveling anvil machine, and the heating apparatus is mounted on the traveling anvil machine.

A sixteenth aspect comprises the apparatus of the thirteenth aspect, wherein the heating apparatus is stationary and the heat source moves downstream simultaneously with the glass ribbon.

A seventeenth aspect comprises the apparatus of the thirteenth aspect, wherein the heat source is a laser-based heat source.

An eighteenth aspect comprises the apparatus of the seventeenth aspect, wherein the laser-based heat source is selected from the group consisting of a $CO_2$ laser, a CO laser, and a UV laser.

A nineteenth aspect comprises the apparatus of the thirteenth aspect, wherein the heat source is an infrared-based heat source.

A twentieth aspect comprises the apparatus of the nineteenth aspect, wherein the infrared-based heat source irradiates the glass ribbon with light in a wavelength range of greater than or equal to about 2.5 microns.

Various modifications and variations can be made to the embodiments described herein without departing from the scope of the claimed subject matter. Thus it is intended that the specification cover the modifications and variations of the various embodiments described herein provided such modification and variations come within the scope of the appended claims and their equivalents.

What is claimed is:

1. A method of forming a glass article, comprising:
    forming a glass ribbon by drawing the glass ribbon from a draw housing in a downstream direction, the glass ribbon comprising a first edge and a second edge each extending in a drawing direction and connected by a central region, and a bead extending in the drawing direction and defined by the first edge and a bead edge between the first edge and a centerline of the ribbon;
    heating one or more portions of only the bead of the glass ribbon to form one or more compressive stress regions in the bead; and
    scoring the glass ribbon to form a score line extending in a direction from the first edge towards the second edge on which the glass ribbon is broken to form the glass article,
    wherein the bead is heated at a position upstream and spaced apart from the score line.

2. The method of claim 1, wherein the heating comprises heating the glass ribbon substantially parallel to the score line.

3. The method of claim 1, wherein the heating comprises heating the glass ribbon diagonally to the score line.

4. The method of claim 1, further comprising heating a portion of the bead at a position downstream from the score line.

5. The method of claim 4, wherein the portion of the bead heated at a position downstream from the score line is heated substantially parallel to the score line.

6. The method of claim 1, wherein a width of the one or more compressive stress regions extends less than about 300 mm across the draw from a closest edge of the glass ribbon.

7. The method of claim 1, wherein a height of the one or more compressive stress regions extends less than or equal to about 50 mm upstream.

8. The method of claim 1, wherein the bead is heated at a position that is greater than or equal to about 50 mm upstream from the score line.

9. The method of claim 1, wherein the heating comprises heating the one or more portions of the bead to have a temperature differential from greater than or equal to about 50° C. to less than or equal to about 200° C. between the one or more compressive stress regions and surrounding portions of the bead.

10. The method of claim 1, wherein the heating comprises exposing one or more portions of only the bead to a heat source having a peak heat flux of less than or equal to about 25 kw/m².

11. The method of claim 1, wherein the heating comprises heating the one or more portions of the bead to a temperature that is less than a strain point of the glass composition forming the glass ribbon.

12. The method of claim 1, wherein the compressive stress region has a compressive stress of greater than or equal to about 16 MPa.

* * * * *